United States Patent
Curtis et al.

(10) Patent No.: US 11,724,197 B2
(45) Date of Patent: *Aug. 15, 2023

(54) DYNAMIC ITEM OBTAIN RATE BASED ON PLAYER PROGRESSION, ACTION, AND OTHER IN-GAME BEHAVIOR

(71) Applicant: Kabam, Inc., San Francisco, CA (US)

(72) Inventors: Matthew Curtis, Novato, CA (US); James Koh, Mountain View, CA (US); Kellen Christopher Smalley, Pleasanton, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/747,847

(22) Filed: May 18, 2022

(65) Prior Publication Data

US 2022/0274025 A1 Sep. 1, 2022

Related U.S. Application Data

(63) Continuation of application No. 17/102,188, filed on Nov. 23, 2020, now Pat. No. 11,389,727, which is a
(Continued)

(51) Int. Cl.
*A63F 13/69* (2014.01)
*A63F 13/70* (2014.01)
(Continued)

(52) U.S. Cl.
CPC .............. *A63F 13/69* (2014.09); *A63F 13/60* (2014.09); *A63F 13/70* (2014.09);
(Continued)

(58) Field of Classification Search
None
See application file for complete search history.

(56) References Cited

U.S. PATENT DOCUMENTS 5,370,399 A 12/1994 Liverance
6,106,395 A 8/2000 Is
(Continued)

OTHER PUBLICATIONS

A Proposal for the Crafting System Author identified by handle "Gicker" http://forum.square-enix.com/ffxiv/threads/10176-A-Proposal-for-the-Crafting-System (Year: 2011), 2 pages.
(Continued)

*Primary Examiner* — Jason T Yen
(74) *Attorney, Agent, or Firm* — Esplin & Associates, PC

(57) ABSTRACT

One aspect of the disclosure relates to altering a probability of fulfilling a game objective in a game space. The game objective may be associated with a set of potential reward items, the set of potential reward items including a first item. Probabilities of the first item from the set of potential reward items being provided to individual users as a reward for completing the game objective may be determined based on the rates of usage of the game space by the user. The probability of the first user being provided with the first item as a reward for completing the game objective may be determined based on the rate of usage of the game space by the first user.

18 Claims, 2 Drawing Sheets

Related U.S. Application Data continuation of application No. 16/735,363, filed on Jan. 6, 2020, now Pat. No. 10,874,946, which is a continuation of application No. 16/160,538, filed on Oct. 15, 2018, now Pat. No. 10,549,201, which is a continuation of application No. 15/877,904, filed on Jan. 23, 2018, now Pat. No. 10,124,259, which is a continuation of application No. 15/606,826, filed on May 26, 2017, now Pat. No. 9,901,830, which is a continuation of application No. 15/403,483, filed on Jan. 11, 2017, now Pat. No. 9,662,586, which is a continuation of application No. 13/863,257, filed on Apr. 15, 2013, now Pat. No. 9,573,051.

(51) Int. Cl.
*A63F 13/60* (2014.01)
*G07F 17/32* (2006.01)

(52) U.S. Cl.
CPC . *A63F 2300/535* (2013.01); *A63F 2300/5546* (2013.01); *A63F 2300/57* (2013.01); *A63F 2300/609* (2013.01); *G07F 17/326* (2013.01); *G07F 17/3262* (2013.01)

(56) References Cited

U.S. PATENT DOCUMENTS

| | | |
|---|---|---|
| 6,267,677 B1 | 7/2001 | Tajiri |
| 6,273,814 B1 | 8/2001 | Komoto |
| 6,439,998 B1 | 8/2002 | Itou |
| 6,585,599 B1 | 7/2003 | Horigami |
| 6,648,760 B1 | 11/2003 | Nicastro |
| 7,824,256 B2 | 11/2010 | Hatayama |
| 8,221,220 B2 | 7/2012 | Ackley |
| 8,317,598 B2 | 11/2012 | McNally |
| 8,328,642 B2 | 12/2012 | Mosites |
| 8,337,300 B2 | 12/2012 | Bowers |
| 10,343,068 B2 | 7/2019 | Curtis |
| 10,549,201 B2 | 2/2020 | Curtis |
| 10,799,796 B2 | 10/2020 | Curtis |
| 10,874,946 B2 | 12/2020 | Curtis |
| 2003/0100375 A1 | 5/2003 | Wakae |
| 2005/0096975 A1 | 5/2005 | Moshe |
| 2006/0287076 A1* | 12/2006 | Kobayashi .......... G07F 17/3232 463/26 |
| 2007/0112706 A1 | 5/2007 | Herbrich |
| 2007/0129148 A1 | 6/2007 | Luchene |
| 2008/0004094 A1 | 1/2008 | Mueller |
| 2008/0039204 A1 | 2/2008 | Ackley |
| 2008/0182658 A1* | 7/2008 | Sakuma ................ G07F 17/32 463/27 |
| 2008/0188312 A1 | 8/2008 | Seelig |
| 2009/0011830 A1 | 1/2009 | Wang |
| 2009/0029769 A1 | 1/2009 | Muller |
| 2009/0042645 A1 | 2/2009 | Graham |
| 2009/0061989 A1 | 3/2009 | Kim |
| 2010/0022289 A1 | 1/2010 | Menicou |
| 2010/0022301 A1 | 1/2010 | Carpenter |
| 2010/0100820 A1 | 4/2010 | Bryant |
| 2010/0227669 A1 | 9/2010 | Luchene |
| 2010/0227677 A1 | 9/2010 | Baerlocher |
| 2010/0240443 A1 | 9/2010 | Baerlocher |
| 2010/0323775 A1* | 12/2010 | Stanley .................. A63F 13/69 463/2 |
| 2011/0261071 A1 | 10/2011 | Ganetakos |
| 2011/0319158 A1 | 12/2011 | Champagne |
| 2012/0036020 A1 | 2/2012 | Flinn |
| 2012/0225723 A1 | 9/2012 | Webster |
| 2012/0290948 A1 | 11/2012 | Elenzil |
| 2012/0329549 A1* | 12/2012 | Johnson .............. G07F 17/3234 463/25 |
| 2013/0059666 A1 | 3/2013 | Duquene |
| 2013/0079145 A1 | 3/2013 | Lam |
| 2013/0288757 A1 | 10/2013 | Guthridge |
| 2013/0288766 A1* | 10/2013 | Terashima .............. A63F 13/69 463/16 |
| 2013/0316782 A1* | 11/2013 | Daniels ................. G07F 17/326 463/18 |
| 2014/0024460 A1 | 1/2014 | Fox |
| 2014/0073416 A1 | 3/2014 | Toyama |
| 2014/0087880 A1 | 3/2014 | Betts |
| 2014/0141863 A1 | 5/2014 | Arnone |
| 2015/0011286 A1* | 1/2015 | Kim .................... G07F 17/3244 463/17 |
| 2017/0072318 A1 | 3/2017 | Curtis |
| 2019/0275432 A1 | 9/2019 | Curtis |
| 2020/0139250 A1 | 5/2020 | Curtis |
| 2021/0001230 A1 | 1/2021 | Curtis |
| 2021/0093975 A1 | 4/2021 | Curtis |
| 2022/0370915 A1 | 11/2022 | Curtis |

OTHER PUBLICATIONS

China imposes online gaming curbs, BBC News, Published: Aug. 25, 2005; 3 pages.
Crafting and skill progression in MMOs—job or game? Author identified by handle "Procne" https://firstearthgame.com/forum/104 (Year: 2012), 20 pages.
Fallen Earth Development Blog, Fallen Earth goes Free2Play Oct. 12th!, Author(s) identified by handle: "Joseph / Linus", Published: Sep. 2, 2011, 10 pages.
Fields, Tim, and Cotton, Brandon, "Virtual Goods—An Excerpt from Social Game Design: Monetization Methods and Mechanics,", Published: Feb. 10, 2012, 7 pages.
Final Fantasy XIV's Play-Limiting Fatigue System Explained—Update; Mike Fahey; Published: Aug. 25, 2010; 4 pages.
Finally, Rest for the Wicked, Damion Schubert http://www.zenofdesign.com/finally-rest-for-the-wicked/#more (Year: 2005), 3 pages.
Firaxis Games, Sid Meier's Civilization V, 2K Games, 2010, 233 pages.
Mekanismer som pavirker bruksmengden av online rollespill [Translation: Mechanisms that affect the amount of use of online role playing games] Trond Viggo Bjerke; Published 2007, pp. i, 1-5, 13-20, 45, 51-60 translated via Google Translate Oct. 28, 2017.
MM or PG design for time-limited players Oct. 18, 2012, Retrieved from: https://gamedev.stackexchange.com/questions/40146/mmorpg-design-for-time-limited-players, 10 pages.
Nest Building with Lucius and Princess K: The Empowerment System; Published: May 26, 2011, 2 pages.
Notice on the implementation of the online game anti-addiction system for protecting the physical and mental health of minors, Central Government of the People's Republic of China Translation obtained via Google Translate Aug. 16, 2018 (Year: 2007), 14 pages.
Sundren Wiki; Pages: "Main Page" and "Crafting System"; Published Sep. 25, 2012; http://www.sundren.org/wiki/index.php?title=Main_Page&oldid=10946; http://www.sundren.org/wiki/index.php?title+Crafting_System&oldid=8549; 9 pages.
Sundren.org Forum thread: "Changing the crafting fatigue system (need opinions)"; Posted by "Kaeldorn"; Latest post published: Jun. 6, 2009; http://www.sundren.org/forum/printthread.php?t=11531&pp=40; 10 pages.
Wurm Online Description and Webpage Collection; Rolf Jansson; Publication Date: None later than Dec. 2, 2012, 128 pages.
"Online gaming" Britannica Online Encyclopedia Retrieved from: www.britannica.com/technology/online-gaming (Year: 2018) (3 pages).
Definition of Online Game Oxford Dictionary on Lexico.com Retrieved from: www.lexico.com/en/definition/online_game (Year: 2020) (1 page).
Mapping Resources to State Functions in Massively Multiplayer Online Games Viknashvaran Narayanasamy, Kok Wai Wong (Year: 2007).
"Tabletop role-playing game" Wikipedia entry (Year: 2022).
Dungeons & Dragons 3.5—Craft Skill System Reference Document Page from D&D Wiki www.dandwiki.com/wiki/SRD:Craft_Skill (Year: 2009).

(56) References Cited

OTHER PUBLICATIONS

What Would You Change to Make Wurm More Attractive to Players? wurmonline.com post, author handle "Hussars" forum. wurmonline.com/index.php?/topic/65383-what-would-you-change-to-make-wurm-more-attractive-to-players/ (Year:2012).

Wurm Online Description and Webpage Collection, latest publication date Dec. 2, 2012 Rolf Jansson forum.wurmonline.com/ web.archive.org/web/20120214200142/https://www.wurmonline.com/ (Year: 2012).

* cited by examiner

DYNAMIC ITEM OBTAIN RATE BASED ON PLAYER PROGRESSION, ACTION, AND OTHER IN-GAME BEHAVIOR

FIELD OF THE DISCLOSURE

This disclosure relates to altering the probabilities of rewards for fulfilling game objectives.

BACKGROUND

Various techniques for accommodating different players of different engagement levels relating to the operation, administration, and/or performance of a virtual world are known. Providing player skill based accommodations (e.g., handicaps) relating to a player's interaction with and performance in an online game is also known.

Conventional systems, however, suffer from various drawbacks and inefficiencies relating to providing player accommodations based on player skill. For example, conventional systems may require individual players of different engagement levels to obtain items at the same rate. Conventional systems further may not account for a usage based accommodation. Other drawbacks may exist.

SUMMARY

One aspect of the disclosure relates to altering the probabilities of rewards for fulfilling game objectives in a game space. One method to modify the chance of obtaining a particular item from the result of an in-game action occurs based on the rate of usage by a user in the game space. Determining the rate of usage of the game space by the user may be based on an amount of time spent by the user in the game space for some real world time. Rate of usage may also be based on an amount of time spent by the user in the game space over some sliding window of real world time, during a previous period of time, the user's progression, the user's action, and/or any other time relating to the game space. Performance of one or more tasks in the game space by the users may determine completion of the game objective. The game objective may be associated with a set of potential reward items. The set of potential reward items may include a first item. Probabilities of the first item from the set of potential reward items being provided to individual users as a reward for completing the game objective may be determined based on the rates of usage of the game space by the user. The probability of the first user being provided with the first item as a reward for completing the game objective may be determined based on the rate of usage of the game space by the first user. Rewards for completion of the game objective may be determined and awarded based on the probability of the user being provided with the first item. The disclosure further exemplifies a system and method relating to altering a probability of fulfilling a game objective in a game space.

A system for altering a probability of fulfilling a game objective in a game space may comprise one or more physical processors configured to execute computer program modules. The computer program modules may comprise a space module, an interaction module, a relationship module, a network module, a usage measurement module, a game objective module, a probability module, a reward determination module and/or a reward dispersal module.

A space module may be configured to execute an instance of a game space, and/or to implement the instance to facilitate presentation of views of the game space to users. The space module may be configured to facilitate interaction of the users with the game space. The users may include first user.

A usage measurement module may be configured to determine rates of usage of the game space by users including a first user. The usage measurement module may be configured such that determining the rate of usage of the game space by the first user may be based on an amount of time spent by the first user in the game space for some real world time. In some implementations, the usage measurement module may be configured such that determining the rate of usage of the game space by the first user comprises determining an average amount of time spent by the first user in the game space over some sliding window of real world time. In some implementations, the usage measurement module may be configured such that determining the rate of usage of the game space by the first user comprises determining an amount of time spent by the first user in the game space during a previous period of time.

A game objective module may be configured to store a game objective. Completion of the game objective may comprise performance of one or more tasks in the game space by the users. The game objective may be associated with a set of potential reward items. The set of potential reward items may include a first item.

A probability module may be configured to separately assign probabilities of the first item from the set of potential reward items which may be provided to individual users as a reward for completing the game objective. The probability module may assign a probability of the first user being provided with the first item as a reward for completing the game objective that may be different than the probabilities of other users being provided with the first item as a reward for completing the game objective. The probability module may be configured to determine the probabilities based on the rates of usage of the game space by the users. The probability of the first user provided with the first item as a reward for completing the game objective may be determined based on the rate of usage of the game space by the first user.

The probability module may be configured such that the probability of the first item being provided to the first user for completing the game objective may be greater than the probability of the first item being provided to a second user for completing the game objective responsive to the rate of usage of the second user being greater than the rate of usage of the first user. In some implementations, the first item may be the most valuable item in the set of potential reward items. In some implementations, potential reward items may comprise one or more of an in-game item, a game level, unlocking game information, and/or acquiring a skill, acquiring one or more of various matters collected in an inventory and/or any other reward related to the game.

A reward determination module may be configured to determine rewards for completion of the game objective based on the probabilities determined by the probability module. A reward for the first user for completing the game objective may be determined based on the probability of the first user being provided with the first item determined by the probability module.

A reward dispersal module may be configured to disperse rewards for completing the game objective within the game. Responsive to the first user completing the game objective, the reward for the first user for completing the game objective may be dispersed to the first user within the game space.

In some implementations, a method for altering a probability of fulfilling a game objective in a game space may comprise: executing an instance of a game space, and implementing the instance to facilitate presentation of views of the game space to users, wherein the space module may be configured to facilitate interaction of the users with the game space, the users may be including a first user; determining rates of usage of the game space by users such that a rate of usage of the game space by the first user may be determined; storing a game objective, wherein completion of the game objective comprises performance of one or more tasks in the game space by the users, the game objective being associated with a set of potential reward items, the set of potential reward items including a first item; assigning probabilities of the first item from the set of potential reward items being provided to individual users as a reward for completing the game objective such that the probability module assigns a probability of the first user being provided with the first item as a reward for completing the game objective that may be different than the probabilities of other users being provided with the first item as a reward for completing the game objective, the probability module being configured to determine the probabilities based on the rates of usage of the game space by the users such that the probability of the first user being provided with the first item as a reward for completing the game objective may be determined based on the rate of usage of the game space by the first user; determining rewards for completion of the game objective based on the probabilities determined by the probability module such that a reward for the first user for completing the game objective may be determined based on the probability of the first user being provided with the first item determined by the probability module; and dispersing rewards for completing the game objective within the game such that responsive to the first user completing the game objective, the reward for the first user for completing the game objective determined by the reward determination module may be dispersed to the first user within the game space.

In some implementations, a non-transitory electronic storage media may store information related to altering a probability of fulfilling a game objective in a game space. The stored information may comprise: a memory configured to store information related to the one or more users of an online game; and instructions configured to cause a client computing platform to: execute an instance of a game space, and to implement the instance to facilitate presentation of views of the game space to users, wherein the space module may be configured to facilitate interaction of the users with the game space, the users including a first user; determine rates of usage of the game space by users such that a rate of usage of the game space by the first user may be determined; store a game objective, wherein completion of the game objective comprises performance of one or more tasks in the game space by the users, the game objective being associated with a set of potential reward items, the set of potential reward items including a first item; assign probabilities of the first item from the set of potential reward items being provided to individual users as a reward for completing the game objective such that the probability module assigns a probability of the first user being provided with the first item as a reward for completing the game objective that may be different than the probabilities of other users being provided with the first item as a reward for completing the game objective, the probability module being configured to determine the probabilities based on the rates of usage of the game space by the users such that the probability of the first user being provided with the first item as a reward for completing the game objective may be determined based on the rate of usage of the game space by the first user; determine rewards for completion of the game objective based on the probabilities determined by the probability module such that a reward for the first user for completing the game objective may be determined based on the probability of the first user being provided with the first item determined by the probability module; and disperse rewards for completing the game objective within the game such that responsive to the first user completing the game objective, the reward for the first user for completing the game objective determined by the reward determination module may be dispersed to the first user within the game space.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
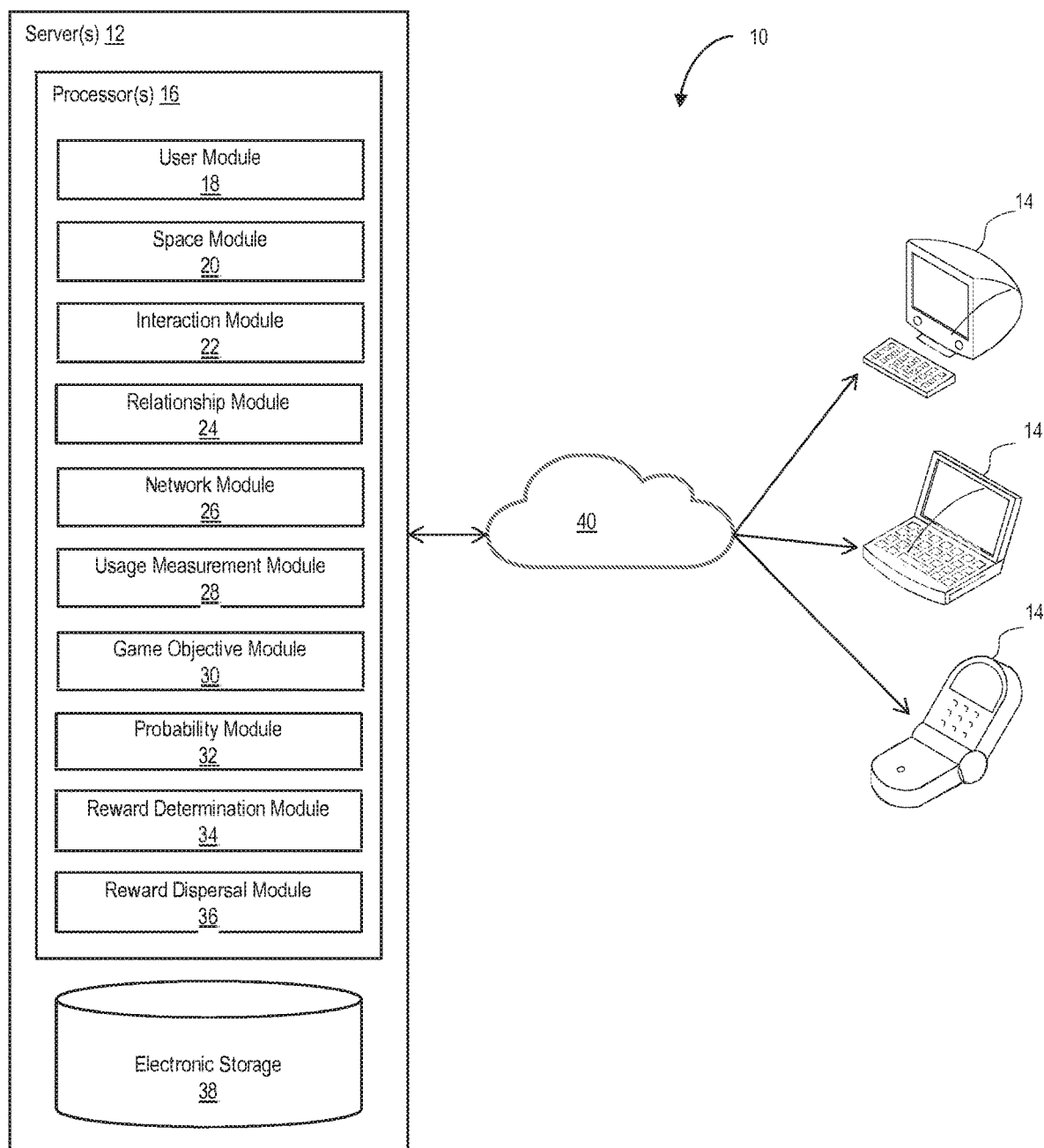
FIG. 1 illustrates an exemplary system configured to altering the probabilities of rewards for fulfilling game objectives, according to an aspect of the invention.

FIG. 1 illustrates a system 10 configured to altering the probabilities of rewards for fulfilling game objectives. Altering the probabilities of rewards makes the game more accessible to casual players. By normalizing different usage rates, a first player does not have to play as long as a second player in order to achieve the same rewards. This may keep players engaged in the game for a longer period of time.

In some implementations, system 10 may include a game server 12. The game server 12 may host a game space in which an online game takes place. The game server 12 may be configured to communicate with one or more client computing platforms 14 according to a client/server architecture. The users (e.g., game players) may access system 10 and/or the game space via client computing platforms 14.

The game server 12 may be configured to execute one or more computer program modules. The computer program modules may include one or more of a user module 18, a space module 20, an interaction module 22, a relationship module 24, a network module 26, a usage measurement module 28, a game objective module 30, a probability module 32, a reward determination module 34, a reward dispersal module 36 and/or other modules.

The user module 18 may be configured to access and/or manage one or more user profiles and/or user information associated with users of the system 10. The one or more user profiles and/or user information may include information stored by game server 12, one or more of the client computing platforms 14, and/or other storage locations. The user profiles may include, for example, information identifying users (e.g., a username or handle, a number, an identifier, and/or other identifying information) within the game space, security login information (e.g., a login code or password), game space account information, subscription information, virtual currency account information (e.g., related to currency held in credit for a user), relationship information (e.g., information related to relationships between users in the game space), game space usage information, demographic information associated with users, interaction history among users in the game space, information stated by users, purchase information of users, browsing history of users, a client computing platform identification associated with a user, a phone number associated with a user, an inventory collection, and/or other information related to users.

Various matters may be collected in an inventory. These matters may include, but are not limited to, virtual items, virtual resources, character attributes, and/or character skills. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, NPCs, building materials, potions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

Space module 20 may be configured to implement the instance of the game space executed by the computer modules. The instance of the game space may reflect the state of the game space. The instance of the game space may be used to push state information to clients for implementation on the clients, may be used to verify state information generated on clients executing expressions of the instance locally, and/or for other purposes. State information may include information about the state of the game space such as, without limitation, position information of one or more objects, topography information, object status/shape information, battle information, score information, user or character progress information, user inventory information, progress information for one or more activities or actions, view information describing a view of the game space, and/or other information that describes the state of the game space.

Expressions of the instance executed on the clients facilitate presentation of views on the clients of the game space. Expressions of the instance executed on the clients may be configured to simply present views of the game space based on the state information (e.g., via streaming view information, object/position information, and/or other state information) received from space module 20. Expressions of the instance executed on the clients may include space logic that effectively provides for execution of a limited version of the instance on a client that is synchronized and/or verified with state information received from space module 20. The view presented on a given client may correspond to a location in the game space (e.g., the location from which the view is taken, the location the view depicts, and/or other locations), a zoom ratio, a dimensionality of objects, a point-of-view, and/or view parameters. One or more of the view parameters may be selectable by the user.

The instance of the game space may comprise a simulated space that is accessible by users via clients (e.g., client computing platforms 14) that present the views of the game space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the game space determined from the instance executed by space module 20 is not intended to be limiting. The game space may be presented in a more limited, or more rich, manner. For example, views of the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the game space are contemplated.

Within the instance of the game space executed by space module 20, users may control characters, objects, simulated physical phenomena (e.g., wind, rain, earthquakes, and/or other phenomena), and/or other elements within the game space to interact with the game space and/or each other. The user characters may include avatars. As used herein, the term "user character" may refer to an object (or group of objects) present in the game space that represents an individual user. The user character may be controlled by the user with which it is associated. The user controlled element(s) may move through and interact with the game space (e.g., non-user characters in the game space, other objects in the game space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the game space.

The users may participate in the instance of the game space by controlling one or more of the available user controlled elements in the game space. Control may be exercised through control inputs and/or commands input by the users through client computing platforms 14. The users may interact with each other through communications exchanged within the game space. Such communications may include one or more of textual chat, instant messages, private messages, voice communications, and/or other communications. Communications may be received and entered by the users via respective client computing platforms 14. Communications may be routed to and from the appropriate users through game server 12 (e.g., through space module 20).

The interaction module 22 may be configured to monitor interactions of the users with the game space and/or each other within the game space. This may include monitoring, for a given user, one or more of times at which the given user may be logged in to the game space, areas of the game space the given user views or interacts with or in, other users the given user interacts with, the nature and/or content of interactions of the given user with other users, activities participated in within the game space, level, powers, or skill attained in the game space, inventory items obtained in the game space, and/or other interactions of the given user with the game space and/or other users. Some or all of the information generated by interaction module 22 in monitoring the interactions of the users may be stored to the user profiles managed by user module 18.

At a given time, interaction module 22 may determine a set of users that are currently engaged with the game space and/or a set of users that are currently not engaged with the game space. Being engaged with the game space may refer to being logged in to the game space, performing some action or interaction within the game space within some period of time (e.g., the last 2 minutes), and/or other taking some other action indicating ongoing and contemporaneous engagement with the game space.

The interaction module 22 may be configured to determine, for individual users, an activity metric that indicates an activity level within the game space. The activity metric may be determined based on one or more of log in frequency, amount of time logged in to the game space within a rolling time period (e.g., over the last day, week, month, or other rolling time period), average amount of time logged in to the game space over some length of time (e.g., per day, per week, and/or other length of time), average log in session time over a rolling time period, number of inter-user communications over a length of time, number of inter-user communications per log in, number of relationships with other users in the game space, number of new relationships with other users in the game space within a rolling time period, amount of real world money spent in the game space, and/or other activity parameters.

Network module 26 of the game server 12 may be configured to maintain a connection to the one or more client computing platforms 14. For example, the network module 26 may maintain one or more communication lines or ports to enable connection and/or exchange of information with a network 40 and/or other computing platforms 14. Information such as state information, game state and game logic may be communicated via network module 26. The network module 26 may be configured to receive information from the client computing platform 14 as well.

A usage measurement module 28 may be configured to determine rates of usage of the game space by users including a first user. The usage measurement module 28 may be configured such that determining the rate of usage of the game space by the first user may be based on an amount of time spent by the first user in the game space for some real world time. For example, in one week (e.g., real world time) a user may play the game space for one hour (e.g., an amount of time spent by the first user in the game space).

In some implementations, the usage measurement module 28 may be configured such that determining the rate of usage of the game space by the first user comprises determining an average amount of time spent by the first user in the game space over some sliding window of real world time. In some implementations, the usage measurement module 28 may be configured such that determining the rate of usage of the game space by the first user comprises determining an amount of time spent by the first user in the game space during a previous period of time. A previous period of time may be any measure of time prior to the current time. In some implementations, the usage measurement module 28 may determine the first user's progression, action and/or any other behaviors which modify the rate of usage.

A game objective module 30 may be configured to store a game objective. Completion of the game objective may comprise performance of one or more tasks in the game space by the users. Individual tasks may have predetermined sets of conditions to be achieved by one or more users in order to unlock a game objective. For example, a game objective may include defeating a boss character, winning a battle, achieving some level of success within a race, locating one or more items in the game space, killing a number of characters, collecting a number of in-game items and/or widgets, reaching a certain destination by clearing a number of obstacles, acquiring a number of virtual currency and/or any other action related to the game and/or collecting various matters in an inventory.

The game objective may be associated with a set of potential reward items. The set of potential reward items may include a first item. Different items in the set of potential reward items for a given game objective may have different "values". The probabilities may reflect the values so that more valuable items are assigned lower probabilities to obtain, and less valuable items are assigned higher probabilities to obtain. In some implementations, potential reward items may comprise one or more of an in-game item, a game level, unlocking game information, and/or acquiring a skill, acquiring one or more of various matters collected in an inventory and/or any other reward related to the game.

A probability module 32 may be configured to separately assign probabilities to the potential reward items. In some implementations, individual items may be assigned a different probability. The probabilities may be assigned for potential reward items on a per-user basis. The probabilities may be assigned based on a first item and a second item. In some implementations, the first item has higher probabilities than the second item for high rates of usage, and first item has lower probabilities than the second item for low rates of usage. In this example, the second item may have a higher value than the first item.

Assigning probabilities may be based on, for example, determining the chance of the user obtaining the first item as a result of an in-game action. An in-game action may be the user obtaining the first item. In some implementations, potential reward items may comprise one or more of an in-game item, a game level, unlocking game information, acquiring a skill, obtaining various items which may be collected in an inventory and/or other rewards related to the game.

For example, if the probability for obtaining the one widget is considered to be X % for successfully performing a game objective, X may be tuned for users having different usage rates to make it take less time, on average, for users having relatively lower usage rates. This may include increasing X to allow user's having relatively lower usage rates a greater chance of obtaining the one widget at individual performances of the game objective. Because of this tuning of X, through repetition of some game objective, on average it may take users having a first usage rate (e.g., a higher usage rate) 15 minutes to obtain one out of 100 widgets. On average it may take users having a second usage rate (e.g., a relatively lower usage rate) 5 minutes through repetition of the same game objective to obtain the same one widget.

The probability module 32 may determine a probability of the first user being provided with the first item as a reward for completing the game objective that may be different than the probabilities of other users being provided with the first item as a reward for completing the game objective. For example, different users may be assigned different probabilities based on a determination of how long it took the individual users to conduct the in-game action.

The probability module 32 may be configured to determine the probabilities based on the rates of usage of the game space by the users. The probability of the first user provided with the first item as a reward for completing the game objective may be determined based on the rate of usage of the game space by the first user.

As exemplified above, the rate of usage of the game space by the first user may comprise determining an average amount of time spent by the first user in the game space over some sliding window of real world time. In other exemplary implementations, the rate of usage of the game space by the first user may comprise determining an amount of time spent by the first user in the game space during a previous period of time. In some implementations, the first user's progression, spend behavior, action and/or any other behaviors may modify the rate of usage.

The probability module 32 may be configured such that the probability of the first item being provided to the first user for completing the game objective may be greater than the probability of the first item being provided to a second user for completing the game objective responsive to the rate of usage of the second user being greater than the rate of usage of the first user.

A reward determination module 34 may be configured to determine rewards for completion of the game objective based on the probabilities determined by the probability module. A reward for the first user for completing the game objective may be determined based on the probability of the first user being provided with the first item determined by the probability module. In some implementations, rewards may comprise the user receiving in-game items, receiving virtual and/or real world currency, receiving game points, being provided with better skills or abilities and/or any type of reward provided in a game space.

A reward dispersal module 36 may be configured to disperse rewards for completing the game objective within the game. Responsive to the first user completing the game objective, the reward for the first user for completing the game objective may be dispersed to the first user within the game space. This may include adding it to the inventory, progressing character along skill tree, unlocking content, and/or other mechanisms for distribution.

The game server 12, client computing platforms 14, and/or external resources may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game servers 12, client computing platforms 14, and/or external resources may be operatively linked via some other communication media.

Game server 12 may include electronic storage 38, one or more processors 16, and/or other components. Game server 12 may include communication lines, or ports to enable the exchange of information with a network 40 and/or other computing platforms 14. Illustration of game server 12 in FIG. 1 is not intended to be limiting. Game server 12 may include a plurality of hardware, software, and/or firmware components operating together to provide the functionality attributed herein to game server 12. For example, game server 12 may be implemented by a cloud of computing platforms operating together as game server 12.

Electronic storage 38 may comprise non-transitory storage media that electronically stores information. The electronic storage media of electronic storage 38 may include one or both of system storage that is provided integrally (i.e., substantially non-removable) with game server 12 and/or removable storage that is removably connectable to game server 12 via, for example, a port (e.g., a USB port, a firewire port, etc.) or a drive (e.g., a disk drive, etc.). Electronic storage 38 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 38 may include one or more virtual storage resources (e.g., cloud storage, a virtual private network, and/or other virtual storage resources). Electronic storage 38 may store software algorithms, information determined by processor 16, information received from game server 12, information received from client computing platforms 14, and/or other information that enables game server 12 to function as described herein.

Processor(s) 16 may be configured to provide information processing capabilities in game server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute modules 18, 20, 22, 24, 26, 28, 30, 32, 34, and 36. Processor 16 may be configured to execute modules 18, 20, 22, 24, 26, 28, 30, 32, 34, and 36 by software; hardware; firmware; some combination of software, hardware, and/or firmware; and/or other mechanisms for configuring processing capabilities on processor 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 24, 26, 28, 30, 32, 34, and 36 are illustrated in FIG. 1 as being implemented within a single processing unit, in implementations in which processor includes multiple processing units, one or more of modules 18, 20, 22, 24, 26, 28, 30, 32, 34, and 36 may be implemented remotely from the other modules. The description of the functionality provided by the different modules 18, 20, 22, 24, 26, 28, 30, 32, 34, and 36 described below is for illustrative purposes, and is not intended to be limiting, as any of modules 18, 20, 22, 24, 26, 28, 30, 32, 34, and 36 may provide more or less functionality than is described. For example, one or more of modules 18, 20, 22, 24, 26, 28, 30, 32, 34, and 36 may be eliminated, and some or all of its functionality may be provided by other ones of modules 18, 20, 22, 24, 26, 28, 30, 32, 34, and 36. As another example, processor 16 may be configured to execute one or more additional modules that may perform some or all of the functionality attributed below to one of modules 18, 20, 22, 24, 26, 28, 30, 32, 34, and 36.

A given client computing platform 14 may include one or more processors configured to execute computer program modules. The computer program modules may be configured to enable an expert or user associated with the given client computing platform 14 to interface with system 10, game server 12, and/or external resources, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

Figure 2:
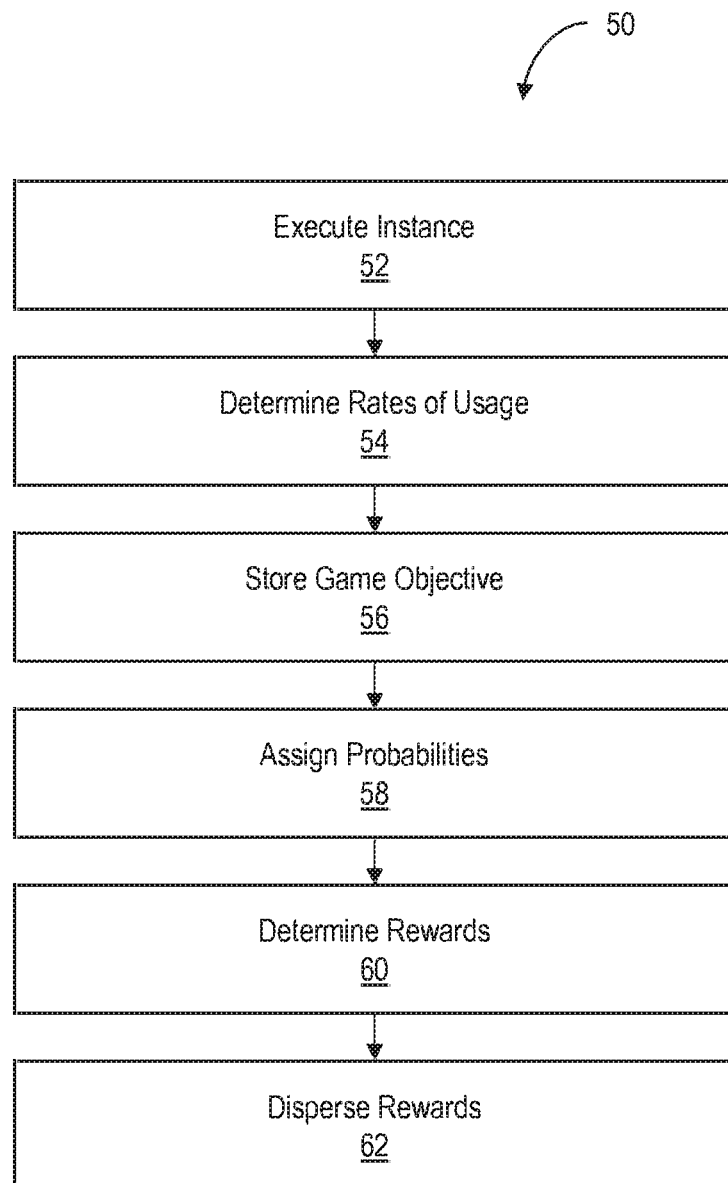
FIG. 2 illustrates an exemplary method configured to altering the probabilities of rewards for fulfilling game objectives, according to an aspect of the invention.

FIG. 2 illustrates a method 50 of altering the probabilities of rewards for fulfilling game objectives, according to an aspect of the invention. The operations of method 50 presented below are intended to be illustrative. In some implementations, method 50 may be accomplished with one or more additional operations not described, and/or without one or more of the operations discussed. Additionally, the order in which the operations of method 50 are illustrated in FIG. 2 and described below is not intended to be limiting.

In some implementations, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, an instance of a game space may be executed to facilitate presentation of views of the game space to users, and facilitate interaction of the users with the game space. The users may include first user.

At an operation 54, a determination may be made of rates of usage of the game space by users including a first user. Determining the rate of usage of the game space by the first user may be based on an amount of time spent by the first user in the game space for some real world time. In some implementations, determining the rate of usage of the game space by the first user comprises determining an average amount of time spent by the first user in the game space over some sliding window of real world time. In some implementations, determining the rate of usage of the game space by the first user comprises determining an amount of time spent by the first user in the game space during a previous period of time.

At operation 56, a game objective may be stored. Completion of the game objective may comprise performance of one or more tasks in the game space by the users. The game objective may be associated with a set of potential reward items. The set of potential reward items may include a first item.

At operation 58, probabilities of the first item from the set of potential reward items which may be provided to individual users as a reward for completing the game objective may be separately assigned. The probability of the first user being provided with the first item as a reward for completing the game objective may be different than the probabilities of other users being provided with the first item as a reward for completing the game objective. The probabilities based on the rates of usage of the game space by the users may be determined. The probability of the first user provided with the first item as a reward for completing the game objective may be determined based on the rate of usage of the game space by the first user.

The probability of the first item being provided to the first user for completing the game objective may be greater than the probability of the first item being provided to a second user for completing the game objective responsive to the rate of usage of the second user being greater than the rate of usage of the first user. In some implementations, the first item may be the most valuable item in the set of potential reward items. In some implementations, potential reward items may comprise one or more of an in-game item, a game level, unlocking game information, and/or acquiring a skill, acquiring one or more of various matters collected in an inventory and/or any other reward related to the game.

In operation 60, a determination of rewards for completion of the game objective based on the probabilities may be determined. A reward for the first user for completing the game objective may be determined based on the probability of the first user being provided with the first item determined.

In operation 62, rewards for completing the game objective within the game are dispersed. Responsive to the first user completing the game objective, the reward for the first user for completing the game objective may be dispersed to the first user within the game space.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for rewarding completion of game tasks in an online game, the system comprising:
one or more physical processors configured by machine-readable instructions to:
automatically monitor, by the one or more physical processors, access by the first user to the online game;
automatically determine, by the one or more physical processors, a first amount of time spent by a first user in the online game, wherein determination of the first amount of time is based on the monitored access by the first user;

automatically determine by the one or more physical processors, a first probability of the first user being provided with one or more potential reward items subsequent to performance of one or more game tasks, wherein determination of the first probability is based on the first amount of time;

select, by the one or more physical processors, a reward to be provided to the first user subsequent to the performance of the one or more game tasks, wherein the reward is selected from the one or more potential reward items in accordance with the first probability; and provide, by the one or more physical processors the reward to the first user.

2. The system of claim 1, wherein the one or more physical processors are configured by machine-readable instructions such that determining the first amount of time is further based on time spent by the first user in the online game per some real-world time.

3. The system of claim 1, wherein the one or more physical processors are configured by machine-readable instructions such that determining the first amount of time is further based on an average amount of time spent by the first user in the online game over some sliding window of real-world time.

4. The system of claim 1, wherein the one or more physical processors are configured by machine-readable instructions such that determining the first amount of time is further based on an amount of time spent by the first user in the online game during a previous period of real-world time.

5. The system of claim 1, wherein the one or more physical processors are configured by machine-readable instructions such that the first probability is greater than a second probability of a second user being provided with the one or more potential reward items subsequent to the performance of the one or more game tasks, wherein a second amount of time is greater than the first amount of time, wherein the second amount of time represents time spent by the second user in the online game.

6. The system laim 1, wherein the one or more physical processors are further configured to:
obtain, by the one or more physical processors, a game objective. wherein the game objective includes the performance of the one or more game tasks in the online game, the game objective being associated with the one or more potential reward items;
wherein the first probability is determined subsequent to completion of the game objective.

7. The system of daim 1, wherein the one or more potential reward items include one or more of an in-game item, a game level, unlocking game information, and/or acquisition of a skill.

8. The system of claim 5, wherein the one or more physical processors are further configured to:
monitor access by the second user to the online game, wherein determination of the second amount of time is based on the monitored access by the second user.

9. The system of claim 1, wherein the one or more physical processors are further configured to:
execute the instance of the online game, and implement the instance to facilitate presentations of views of the online game to users through displays of client computing devices associated with the users, wherein the users include the first user; and
facilitate interaction of the users with the online game, wherein the users are associated with user accounts, wherein the user accounts include a first user account, wherein the first user is associated with the first user account.

10. A computer-implemented method for rewarding completion of game tasks in an online game, the method being implemented in a computer system that includes one or more physical processors configured by machine-readable instructions, the method comprising:
automatically monitoring, by the one or more physical processors, access by the first user to the online game;
automatically determining, by the one or more physical processors, a first amount of time spent by a first user in the online game;
automatically determining, by the one or more physical processors, a first probability of the first user being provided with one or more potential reward items subsequent to performance of one or more game tasks, wherein determination of the first probability is based on the first amount of time;
selecting, by the one or more physical processors, a reward to be provided to the first user subsequent to the performance of the one or more game tasks, wherein the reward is selected from the one or ore potential reward items in accordance with the first probability; and
providing, by the one or more physical processors, the reward to the first user.

11. The method of claim 10, wherein determining the first amount of time is further based on time spent by the first user in the online game per some real-world time.

12. The method of claim 10, wherein determining the first amount of time is further based on an average amount of time spent by the first user in the online game over some sliding window of real-world time.

13. The method of claim 10, wherein determining the first amount of time is further based on an amount of time spent by the first user in the online game during a previous period of real-world time.

14. The method of claim 10, wherein the probability of the first item being provided to the first user is greater than a second probability of a second user being provided with the one or more potential reward items subsequent to the performance of the one or more game tasks, wherein the second user is associated with a second user account, wherein a second amount of time is greater than the first amount of time, and wherein the second amount of time represents time spent by the second user in the online game.

15. The method of daim 11, further comprising:
obtaining, by the one or more physical processors, a game objective, wherein the game objective includes the performance of the one or more game tasks in the online game, the game objective being associated with the one or more potential reward items;
wherein the first probability is determined subsequent to completion of the game objective.

16. The method of claim 10, wherein the one or more potential reward items include one or more of an in-game item, a game level, unlocking game information, and/or acquisition of a skill.

17. The method of claim 14, further comprising:
monitoring access by the second user to the online game, wherein determining the second amount of time is based on the monitored access by the second user.

18. The method of claim 10, further comprising:
executing the instance of the online game, and implementing the instance to facilitate presentations of views of the online game to users through displays of client computing devices associated with the users, wherein the users include the first user; and facilitating interaction of the users with the online game, wherein the users are associated with user accounts, wherein the user accounts include a first user account, wherein the first user is associated with the first user account.

* * * * *